2,977,260
INHIBITION OF CORROSION OF ALUMINUM ALLOYS

Gregory J. Biefer and Ferdinand H. Krenz, Deep River, Ontario, Canada, assignors to Atomic Energy of Canada Limited, Ottawa, Ontario, Canada, a company of Canada No Drawing. Filed Oct. 9, 1958, Ser. No. 766,179

7 Claims. (Cl. 148—6.27)

This invention relates to the method of inhibiting corrosion of aluminum-nickel alloys and particularly for preventing corrosion of aluminum-nickel fuel rod sheaths in nuclear reactors.

In nuclear reactors the sheathed fuel rods are often water-cooled. Cooling water passes over the sheath at a temperature of from about 150 to 350° C. and for example at 200 to 260° C. at a linear flow velocity of 20 ft./sec. Under these conditions aluminum sheaths corrode rapidly.

It is the object of the present invention to greatly reduce the corrosion rate of aluminum-nickel alloys in dilute aqueous solutions at a temperature from 150–350° C.

The invention comprises the addition of silicic acid (measured as $SiO_2$) to the aqueous solution in which the alloy is immersed in use at a temperature of 150 to 350° C. The amount of silicic acid may vary from a minimum of 100 p.p.m. up to that amount which produces saturation of silicic acid in the aqueous solution at the temperature of operation and gives the solution a pH of not substantially less than 5.0. A base, such as sodium or potassium hydroxide may be added to raise the pH to about 7.

The water used in the process is preferably distilled and deionized water.

The invention will be described more specifically in relation to the inhibition of corrosion of aluminum-nickel atomic fuel rod sheaths but clearly is not limited thereto.

Atomic fuel rods are cooled by passing an aqueous solution, generally hot water, over the sheath in a closed recirculating system. The water may be at a temperature of from 150 to 350° C. and preferably about 260° C. at a linear velocity of 20 ft./sec. As is well known at this temperature aluminum-nickel alloys are corroded at the rate of about 0.010 to 0.100 inch/year under these conditions. According to the present invention from 100 to 1500 and preferably from 800 to 1000 p.p.m. of silicic acid is added to the cooling water. The corrosion rate is thus reduced to about 0.001 inch/year or less. Prior to exposure in the system the aluminum-nickel alloys may first be heated in a prepared aqueous static solution containing the silicic acid to a temperature of 150 to 350° C. and preferably 250 to 350° C. for at least about one day and as long as about seven days. In both cases a thin durable coat of complex aluminum silicate is formed on the surface of the alloy which is highly corrosion resistant. The coating may comprise montmorillonite, kaolinite or mixtures thereof.

The method is most effective in treating aluminum-nickel alloys of 0.5 to 5.0 weight percent nickel and particularly aluminum alloys containing 0.5–2.5 weight percent nickel; 0.5–1.0 weight percent iron; 0.1–0.2 weight percent silicon.

Silicic acid may be conveniently added to a high temperature circulating system as soluble sodium or potassium silicate, and the cation removed by means of cation ion exchange bed in parallel with the system until the desired pH is reached. The resulting solution may then be equilibrated with a standard mixed ion exchange resin bed, which may be used to maintain purity and pH level.

Specifically the mixed bed resin equilibrated with silicic acid is installed in a cooled bypass in parallel with the main circuit of a recirculating system and the flow through the bypass is regulated to maintain the silicic acid in the desired concentration range in the cooling water. The resin acts as a reservoir of silicate ions from which the silicate deposited on the sheath is replaced in the cooling water.

The following examples are illustrations of the striking advantage of the present invention:

(1) At 300° C. in static pure water (i.e., distilled, then deionized by passage through a conventional ion exchange column) to which 1200 p.p.m. of silicic acid had been added an aluminum-nickel alloy of the composition—0.5 nickel, 0.5 iron and 0.2 silicon, the rest aluminum—corrodes at a rate of 0.0006 inch per year.

(2) At 300° C. in static pure water to which 1000 p.p.m. of silicic acid has been added and then neutralized by addition of KOH the same alloy corrodes at a rate of less than 0.0001 inch per year.

(3) At 260° C. in static pure water to which 1000 p.p.m. of silicic acid has been added the same alloy corrodes at a rate of 0.00025 inch per year.

(4) At 260° C. in flowing pure water to which 600–1000 p.p.m. of silicic acid has been added and which is flowing over the surface of the aluminum-nickel sample at a linear velocity of 20 ft./sec. the same alloy corrodes at a rate of less than 0.001 inch per year.

(5) At 260° C. in flowing pure water, without added silicic acid, in which the water is flowing over the surface of the aluminum-nickel sample at a linear velocity of 20 ft./sec. the same alloy corrodes at a rate of 0.05 inch per year.

What is claimed is:

1. The process for inhibiting the corrosion of an Al—Ni alloy containing from 0.5–5% Ni which is in contact with an aqueous system at from 150° to 350° C., wherein the alloy is contacted, at said temperature, with a solution consisting essentially of silicic acid in substantially deionized water, the silicic acid being present in an amount varying between 100 p.p.m. up to that amount which produces saturation at the temperature of operation, the silicic acid solution having a pH of not substantially less than 5.0.

2. The process defined in claim 1 wherein distilled deionized water and a temperature from 250 to 350° C. is used.

3. The process of claim 1 wherein said silicic acid solution is neutralized.

4. The process as defined in claim 1 wherein the alloy consists of 0.5 to 2.5% nickel; 0.5 to 1.0% iron; 0.1 to 0.2% silicon and the remainder aluminum.

5. The process as defined in claim 1 wherein silicic acid is continuously added to the solution in order to maintain the concentration within the desired range throughout the contact period.

6. The process for inhibiting the corrosion of an Al—Ni alloy as in claim 1 wherein the alloy is an atomic fuel rod sheath.

7. The process of claim 1 wherein the silicic acid is added to the water by passing the water through an ion exchange mixed bed resin producing silicate ions.

(References on following page)

References Cited in the file of this patent

UNITED STATES PATENTS

| | | |
|---|---|---|
| 1,383,517 | Bezzenberger et al. | July 5, 1921 |
| 2,450,327 | Cogan et al. | Sept. 28, 1948 |
| 2,495,836 | Comstock | Jan. 31, 1950 |
| 2,711,974 | Happe | June 28, 1955 |
| 2,714,066 | Jewett et al. | July 26, 1955 |
| 2,744,064 | Moore | May 1, 1956 |
| 2,827,429 | Binner et al. | Mar. 18, 1958 |
| 2,871,176 | Draley et al. | Jan. 27, 1959 |

OTHER REFERENCES

Argonne National Laboratory, "Corrosion Resistant Aluminum Above 200° C," ANL–5430, July 15, 1955 (pages 23, 31, 33 and 35 relied on).